United States Patent [19]

Ashrawi

[11] Patent Number: 5,083,612
[45] Date of Patent: Jan. 28, 1992

[54] HOT WATER, SURFACTANT, AND POLYMER FLOODING PROCESS FOR HEAVY OIL

[75] Inventor: Samir S. Ashrawi, Austin, Tex.

[73] Assignee: Texaco Inc., White Plains, N.Y.

[21] Appl. No.: 539,246

[22] Filed: Jun. 18, 1990

[51] Int. Cl.[5] .................. E21B 43/22; E21B 43/24
[52] U.S. Cl. ........................... 166/272; 166/273; 252/8.554
[58] Field of Search ............ 166/272, 273, 274, 303; 252/8.554

[56] References Cited

U.S. PATENT DOCUMENTS

| | | | |
|---|---|---|---|
| 3,802,508 | 4/1974 | Kelly et al. | 166/272 |
| 4,088,189 | 5/1978 | Shupe | 166/272 |
| 4,175,618 | 11/1979 | Wu et al. | 166/272 X |
| 4,412,926 | 11/1983 | Nieh et al. | 252/8.554 |
| 4,643,256 | 2/1987 | Dilgren et al. | 166/272 X |
| 4,646,833 | 3/1987 | De Ruiter | 166/272 |
| 4,820,429 | 4/1989 | Lim | 166/272 X |

Primary Examiner—George A. Suchfield
Attorney, Agent, or Firm—Jack H. Park; Kenneth R. Priem; Harold J. Delhommer

[57] ABSTRACT

Injection of steam or other thermal fluid for recovery of heavy crude oil is accompanied by or followed by injection in the same well of a solution of petrochemical sulfonate and a co-surfactant, the co-surfactant being either an olefin sulfonate or a propane sulfonate of an ethoxylated alcohol or alkyl phenol. The surfactant mixture is followed by injection in the same well of a water-soluble polymer solution and additional oil is recovered from production wells.

10 Claims, 2 Drawing Sheets

HOT WATER, SURFACTANT, AND POLYMER FLOODING PROCESS FOR HEAVY OIL

FIELD OF THE INVENTION

This invention relates to an enhanced oil recovery process for heavy or highly viscous petroleum wherein a mixture of surfactants is added to at least a part of the water that is injected during a thermal recovery process and the surfactant solution is followed by an aqueous polymer solution injected into the wells where surfactants were injected. The surfactant mixtures are selected to produce optimum phase behavior, minimum interfacial tension and optimum displacement of the crude oil under conditions of high temperature, moderate total salt content and relatively high hardness of the water which exist in the hot water zone of a thermal process.

DESCRIPTION OF RELATED ART

Many crude oils are characterized by high viscosity under natural reservoir conditions. The viscosity is often so high that fluids normally used for displacing crude oil in the earth, such as water or various gases, are very ineffective in displacing the petroleum. Fortunately, however, the viscosity of these crude oils can be drastically lowered by increasing the temperature. For example, the viscosity of one such crude oil is reduced from 644 cp at 40° C. to 54 cp at 95° C.

The normal way to heat a viscous or heavy crude oil in situ is to inject a thermal recovery fluid such as steam or hot water. Since the steam has a lower density than the crude oil, it tends to rise to the top of a reservoir containing heavy crude oil and travel only along the top of that reservoir. Both the steam and hot water are lower in viscosity than the oil, so these fluids tend to channel through the oil. The flow of the heating fluids predominantly along the top and through channels may severely decrease oil recovery by thermal processes. Two methods which employ surfactant solutions have been proposed to divert the steam away from the top of the oil reservoir and to minimize flow through channels, thereby allowing the steam to sweep a greater vertical extent of the oil column. One of the these methods employs surfactants to form an emulsion in the swept portion of the reservoir and decrease channeling. This process is disclosed in U.S. Pat. No. 4,175,618. In this method, the surfactants are selected for their efficacy in forming emulsions. The other method employs surfactants to form a foam which is injected into the reservoir, as is disclosed in U.S. Pat. No. 4,161,217. The surfactants in this method are selected to form a stable, high-temperature foam.

In addition to the lack of sweep efficiency of the reservoir which limits recovery of heavy oil by thermal processes, there is a second mechanism which also greatly decreases the amount of viscous or heavy crude oil that can be recovered by steam or hot water injection. This mechanism is the same as that which limits the recovery of lower viscosity crude oils by water flooding at natural reservoir temperatures. It is caused by capillary forces in the rock, which cause oil to be trapped by a displacing fluid which is immiscible with the oil. Various processes are known in the industry which use surfactants added to the water to lower the interfacial tension between oil and water, thereby lowering the capillary forces which trap the oil in the rock. Techniques for screening for effective surfactants to minimize interfacial tension and maximize oil displacement by surfactant solutions are described in the paper SPE/DOE 12702, by S. S. Ashrawi, entitled "A Study of the Relationship Between Surfactant/Oil/Brine System Phase Behavior and Chemical Flood Recovery in Short Cores," presented at the SPE/DOE Fourth Symposium on Enhanced Oil Recovery held in Tulsa, Okla., April, 1984.

When steam is used to displace a heavy oil from a reservoir, hot water is sometimes injected along with the steam; i.e., less than 100% quality steam is injected. Even if 100% quality steam is injected, a hot water zone forms in the reservoir from condensation of steam as heat is transferred from steam to the rock and is conducted from the permeable rock to the rock adjacent to the steam zone. It is well-known in the industry that hot water is not as effective as steam in displacing oil from an unheated formation, although hot water injection is less costly than steam injection. A method for improving steam-drive performance, therefore, is needed to increase the displacement efficiency of hot water. This increase may be effected by the addition of surfactants to the hot water to lower the interfacial tension and mobilize oil. Both organic and inorganic chemicals have been suggested as steam flood additives in an attempt to mobilize the oil which is not displaced by hot water. (V.M. Ziegler, "A Laboratory Investigation of High-Temperature Surfactant Flooding," SPE 13071, presented at the SPE meeting in Houston, Tex., September, 1984).

Any surface active chemical used to increase oil recovery by hot water must be stable at and operate under conditions of temperature much above normal reservoir temperatures. Also, the surface active chemical solutions must have tolerance for multivalent ions (such as calcium and magnesium) in formation water and a wide range of total dissolved sodium and other salts in the water. Many heavy oil reservoirs contain water of low salinity, since they may have been steam flooded or water flooded. Also the oils are often shallow in the earth and water salinity tends, generally, to be lower at lesser depths in the earth. If the water is low in total salts, this often means an abnormally high ratio of multivalent ions, such as calcium, to monovalent ions, commonly sodium. The use of ionic surfactants then requires very special techniques to control the effects of the multivalent ions on the behavior of the surfactants.

The following U.S. Patents describe a process and a composition for mobilizing crude oil at normal reservoir temperatures using mixtures of an organic sulfonate surfactant, a sulfated or sulfonated oxyalkylated alcohol and a polyalkylene glycol alkyl ether: U.S. Pat. Nos. 3,827,497 and 3,890,239. U.S. Pat. No. 4,018,278 discloses the use of sulfonated ethoxylated alcohol, either as a single surfactant or as a co-surfactant with conventional anionic surfactants such as petroleum sulfonate or petrochemical sulfonate in reservoirs at higher temperatures and high salt and divalent ion concentrations. The sulfonated ethoxylated alcohols of U.S. Pat. No. 4,018,278 have the general formula

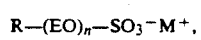

where R is an alkyl or alkylaryl radical, EO represents ethylene oxide groups, n is from 2 to 21 and M is a metallic cation or ammonium ion.

The high temperatures associated with thermal recovery processes pose special problems for water-surfactant flooding. It is taught in the prior art that extremely low oil-water interfacial tensions must be achieved in order to mobilize oil by water, but it is not taught how these extremely low interfacial tensions can be achieved when the water temperature is much higher than normal reservoir temperature, especially when it is necessary to consider relatively high ratios of divalent ion concentrations to monovalent ion concentrations. Also, the high molecular weight hydrocarbons in heavy or viscous oil make achieving low interfacial tension more difficult.

The prior art leaves much to be accomplished to improve quantitative waterflood recovery of oil in the environment of thermal recovery processes--high temperature, moderate amounts of total dissolved solids, and relatively high concentrations of divalent ions.

SUMMARY OF THE INVENTION

I have discovered an improved thermal process for recovering viscous oil from a subterranean porous and permeable formation. The formation, usually penetrated by an injection well and a production well, is first heated by the injection of a thermal recovery fluid, usually steam or hot water. The thermal fluid may be injected first in injection wells and produced back through the same wells, in a cyclic process, to initiate the process, but a flooding process using the thermal fluid is normally carried out before or simultaneously with injection of a mixture of surfactants. The surfactant mixture may be added to hot water which is injected either alone or along with steam. If the water is injected along with steam, the surfactant mixture in the water mobilizes additional oil in the hot water zone of the reservoir and increases oil recovery. Alternately, surfactant mixture solution is injected in water after steam injection has ceased or in slugs of water injected between periods of steam injection. In each case, a surfactant mixture is injected into the water phase until a slug of surfactant is moving through the reservoir. The surfactant solution is then followed by a solution of a water-soluble polymer and additional oil is recovered through production wells.

Two types of co-surfactants combined with a petrochemical sulfonate have been found to be surprisingly effective in recovering additional oil in a hot water zone. One mixture comprises a petrochemical sulfonate having surfactant properties and a propane sulfonate of an ethoxylated alcohol or an oxylated alkyl phenol. The other mixture comprises a petrochemical sulfonate having surfactant properties and an alpha-olefin sulfonate. The propane sulfonate of an ethoxylated alcohol or alkyl phenol has the general formula, as later defined:

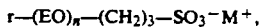

$$r-(EO)_n-(CH_2)_3-SO_3^- M^+,$$

The alpha-olefin sulfonate has the general formula, as later defined:

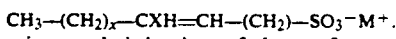

$$CH_3-(CH_2)_x-CXH=CH-(CH_2)-SO_3^- M^+.$$

Following each injection of the surfactant mixture, a polymer solution containing polysaccharide biopolymers or polyacrylamide polymers is injected. Polyacrylamide polymers are preferred when the salinity and calcium ion content are low because of greater thermal stability.

DETAILED DESCRIPTION OF THE INVENTION

The process of my invention allows an improvement in oil recovery from a steam or hot water flooding oil recovery process by the use of certain surfactant mixtures in hot water. The surfactants may be added to cold water at the surface as long as they have sufficient solubility, because the water will be heated as it flows through rock which has been previously heated by injection of a thermal fluid. Normally the injected water will be in equilibrium with steam at high pressure injection conditions. The injected water containing the surfactant normally is formulated to contain about the same salt content as connate water in the reservoir with the crude oil, but may contain more or less total dissolved solids or divalent ions.

Figure 1:
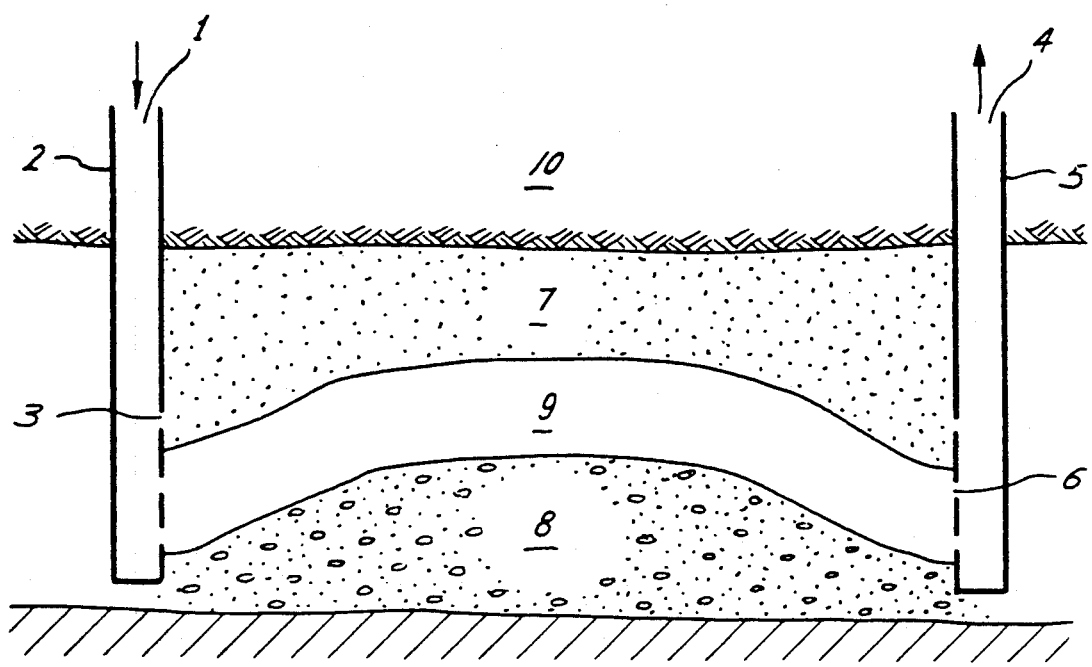
FIG. 1 is a cross-section of a heavy oil reservoir containing an injection and a production well and showing the fluid distribution after steam has been injected for sufficient time for steam production to be occurring in the production well. An intermediate zone of hot water exists between the steam zone at the top and the undisplaced oil zone at the bottom of the reservoir.

The process of my invention is best understood by referring to the attached figures. FIG. 1 represents a snapshot in time after steam injection has occurred between an injection well 1 containing casing 2 and perforations 3 and a production well 4 containing casing 5 and perforations 6. Steam injection has occurred for a sufficient period of time that a steam zone 7 has formed across the top of the porous permeable subterranean formation. Steam is then flowing into the production well 4. Since steam density is much less than the density of viscous oil, steam has flowed preferentially along the top of the porous permeable zone and an untreated oil-bearing zone 8 is still at the original temperature of the reservoir and still contains the original amount of oil. The steam zone 7 may exist over a relatively small vertical extent of the reservoir if the reservoir is very thick and no methods have been used to divert the steam to lower parts of the oil column.

Regardless of whether or not hot water was injected along with the steam, a hot water zone 9 exists between the steam zone 7 and the unheated zone 8, because of heat transfer to the reservoir rock and heat losses to the overburden 10 and the underlying oil zone 8. Heat loss from the steam leads to condensation of water, which segregates from the low density steam because of gravity. If water injection has occurred in alternate slugs with steam or along with the steam, the hot water zone 9 will be thickened.

Figure 1A:
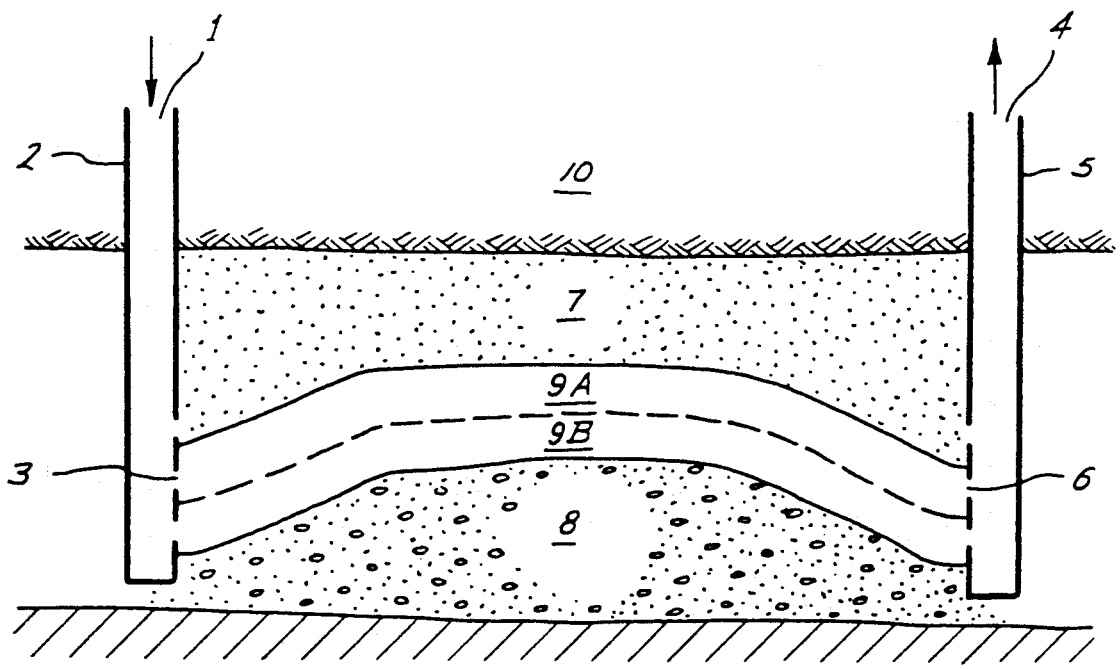
FIG. 1A is a detailed cross-section of a segment of the reservoir shown in FIG. 1 showing the distinct sub-zones in the intermediate zone of hot water, wherein surfactant and salt concentrations may vary.

If hot water containing a surfactant mixture has been injected along with the steam, the hot water will tend to segregate from the steam in the reservoir and the hot water zone 9 will tend to consist of two parts, as shown in FIG. 1A. The surfactant solution will be concentrated primarily in the lower part of zone 9, i.e., into zone 9b. The condensate from the steam will tend to segregate from the steam as it forms in the reservoir and the condensate will be void of surfactant. The condensate will migrate downward by gravity to coalesce in zone 9a. Additional oil recovery will be achieved in zone 9b because of the presence of the surfactant. To the extent that the surfactant from zone 9b mixes with the condensate in zone 9a, additional oil recovery will also occur in that zone as the solutions move through the oil reservoir toward the production well 4, shown in FIG. 1.

Figure 2:
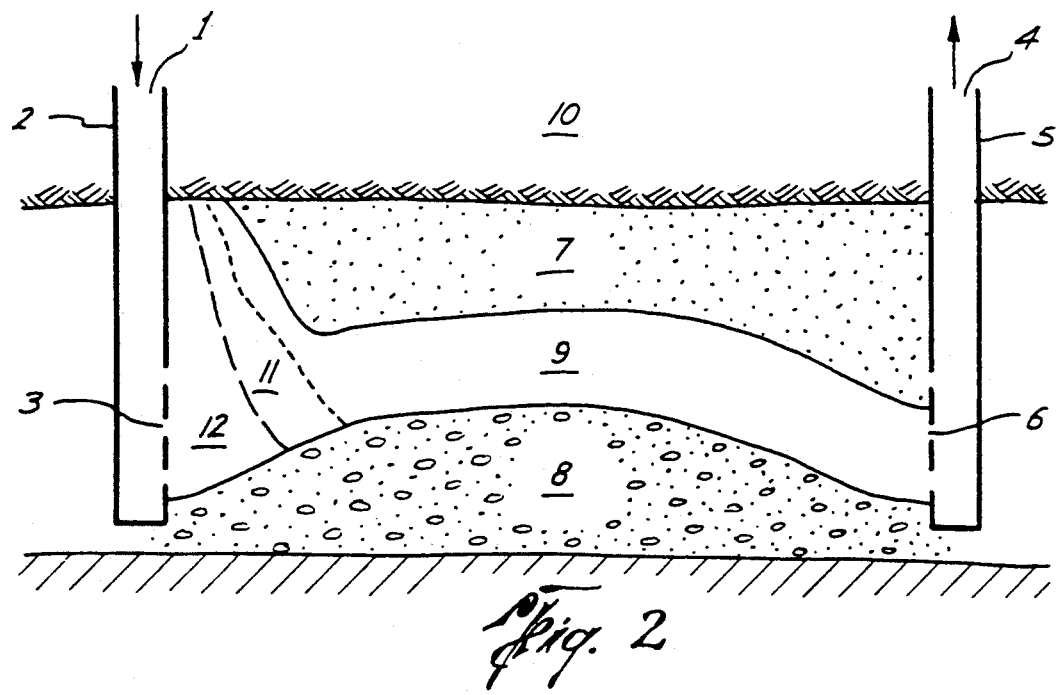
FIG. 2 shows fluid saturations in the reservoir after steam has broken through, injection of a slug of water containing the surfactant solution has occurred, and injection of a slug of polymer solution has occurred.

It is well-known in the art of steam flooding of oil reservoirs to inject through the injection well 1 into the formation slugs of water alternately with steam injection. A slug of fluid is a volume sufficient to saturate the rock in a certain zone with that fluid for at least a few feet around an injection well, although it may be a volume sufficient to saturate the rock for hundreds of feet around an injection well. For example, a slug of water would be a volume sufficient to saturate the rock in the steam zone for at least a few (say, more than five) feet around the injection well. In any case, the water may be injected in an effort to sweep a greater portion of the reservoir with thermal fluids. However, I have discovered that by adding surfactants to at least some of the water injected a greater amount of oil can be recovered from a given formation. FIG. 2 shows the results of the practice of my invention where surfactant solution has been injected in a slug of water 11 and this surfactant solution has been followed by a slug of the polymer solution 12. In another embodiment of my invention, surfactant solution is injected with the steam, followed by a surfactant solution 11 which, in turn, is followed by polymer solution 12. In this embodiment, zone 9 in FIG. 2 would again be broken into zone 9a and zone 9b, as shown in FIG. 1a. In another embodiment of my invention, the fluid distribution shown in FIG. 2 is followed by steam injection. In this embodiment, steam will channel through the viscous zone and again eventually override the reservoir, but some of the steam will also be diverted to zone 8, resulting in increased vertical conformance of the oil displacement. In another embodiment of my invention, blocking of the steam zone is also achieved by use of foam or emulsions generated in situ, for example as taught in U.S. Pat. No. 4,175,618 (emulsion) or U.S. Pat. No. 4,161,217 (foam), the disclosures of which are incorporated herein by reference for all purposes.

The preferred mixture of surfactants for use in the process of my invention is a petrochemical sulfonate and a co-surfactant. The petrochemical sulfonate is made from petroleum derivates and has the formula $$R\text{---}(SO_3)^-M^+$$

where R is an alkyl, either linear or branched, having from 8 to 24 carbon atoms, or alkyl-aryl, such as, for example, benzene or toluene, having attached thereto at least one alkyl group, linear or branched, containing from 6 to 18 carbon atoms in the alkyl chain, and M is a monovalent cation, preferably an alkali metal such as sodium. The essential requirement is that the sulfonate have surfactant properties. Such sulfonates have been widely available commercially and their use in combination with co-surfactants has been disclosed for oil recovery as in U.S. Pat. No. 3,890,239.

The use of a petrochemical sulfonate alone is not sufficient for oil recovery by water at high temperature and hardness in the water. A co-surfactant is required. The co-surfactant is either a propane sulfonate of an ethoxylated aliphatic alcohol or an alpha-olefin sulfonate. The propane sulfonate has the formula $$R\text{---}(OC_2H_4)_n(CH_2)_3SO_3^-M^+$$

where R is an alkyl group containing from 8 to 12 carbon atoms, or alkyl-aryl, such as, for example, benzene or toluene, having attached thereto at least one alkyl group, linear or branched, containing from 6 to 18 carbon atoms in the alkyl chain, n is from 2 to 10, preferably from 5 to 7, and M is a monovalent cation such as, for example, sodium. This product is prepared by processes which are known in the art, as described in U.S. Pat. Nos. 4,442,042 and 4,267,123, which are incorporated herein by reference. Such products are available commercially from PPG Industries of Pittsburgh, Pa. under the Trademark "AVANEL." One such non-commercial product, N-60PS, was manufactured by Texaco Chemical by reacting an average of 6 moles of ethylene oxide per mole of nonyl phenol and capping the ethylere oxide units with a propane sulfonate moiety.

Alternately, the co-surfactant is an alpha-olefin sulfonate, having the general formula $$CH_3\text{---}(CH_2)_x\text{---}CH{=}CH\text{---}(CH_2)_y\text{---}SO_3^-M^+.$$

wherein x=0 to 15 and x+y is greater than 8 and less than 16; M is a monovalent alkali metal or ammonium; preferably, sodium or potassium. Preferably, x is 5 to 12, and y is 0 to 5. For example, the commercial products SIPONATE A-167 and SIPONATE A-246LX, manufactured by Alcolac, Inc., of Baltimore, Md., are suitable.

Figure 3:
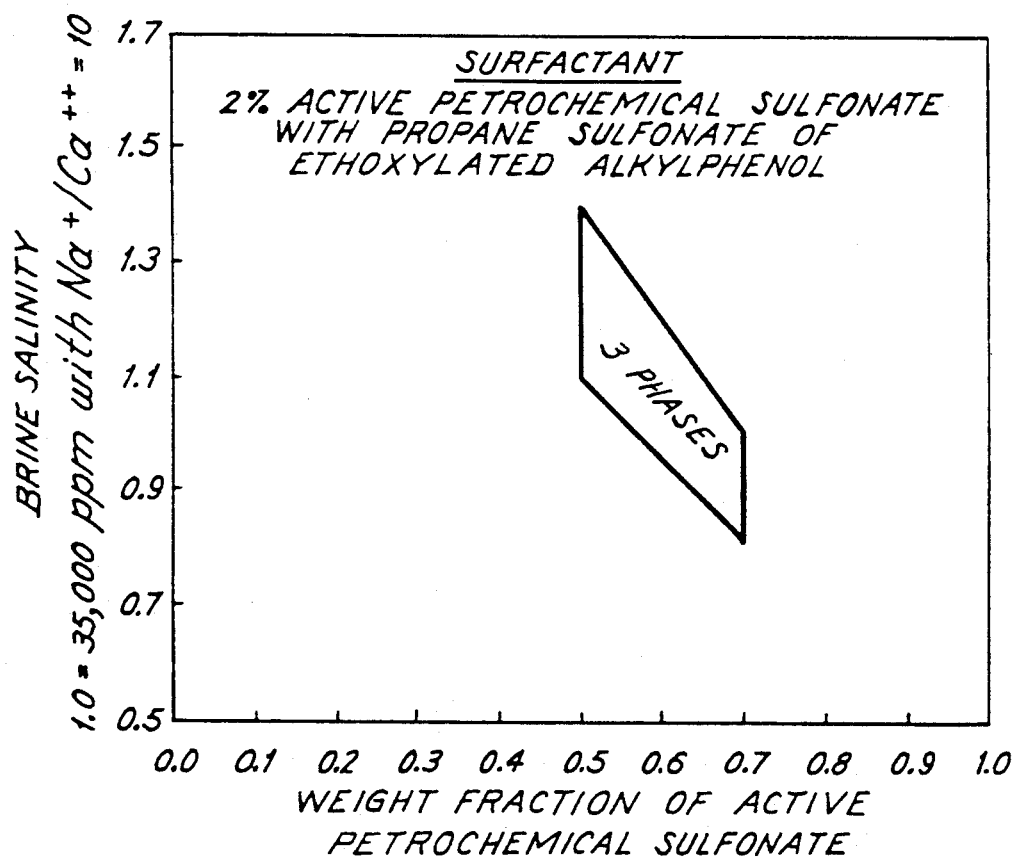
FIG. 3 shows the three-phase region boundaries in a mixture of surfactant in brine and crude oil.

An effective amount of co-surfactant is selected by determining a phase diagram at an expected reservoir temperature using varying amounts of surfactants and varying ratios of petrochemical sulfonate to co-surfactant and different salinities in the flooding brine phase, in contact with the crude oil. An effective amount of co-surfactant is that which causes the formation of three phases when crude oil and the water phase are mixed and then allowed to equilibrate. FIG. 3 illustrates the ranges of brine salinities and the weight fraction of petrochemical sulfonate in the sulfonate-cosurfactant mixture which cause formation of a three-phase region. The third phase or mid-phase exists between a predominantly oil phase and the aqueous phase. The existence of this third phase indicates high efficiency of a flood using the composition of the aqueous phase. It has been found that the lowest interfacial tension conditions exist when the combination of surfactants and salinity of the brine with a given crude oil and temperature form a midphase region. Such a procedure is described in the paper "A Study of the Relationship between Surfactant/Oil/Brine System Phase Behavior and Chemical Flood Recovery in Short Cores", by S. S. Ashrawi, SPE/DOE Paper 12702, April 1984 which is incorporated herein by reference.

An effective amount of co-surfactant is any amount between the lowest and the highest ratios of co-surfactant to petrochemical sulfonate that produce a third phase in the presence of brine salinities in the hot water zone. The co-surfactants of Applicant's invention are effective with a ratio by weight of petrochemical sulfonate to co-surfactant in the range of 1:1 to 20:1.

The total amount of petrochemical sulfonate and co-surfactant used in the water phase is determined from phase diagram determinations and by economic limitations. Concentrations between about 0.5% by weight and 5.0% by weight are acceptable, with the preferred range being from 1% to 3%.

The polymer solution 12 preferably comprises a polysaccharide biopolymer. Some examples of readily available polymers are sold under the names of FLOCON 4800-MT, manufactured by Pfizer, and ACTIGUM CS-11, which is manufactured by Merot Rousselot Satia. The concentrations of polymer will depend on polymer molecular weight, temperature, brine composition and oil viscosity under conditions of the reservoir, but preferably will be from about 500 ppm by weight to about 3000 ppm by weight. In low salinity brines with low divalent ion concentrations, a polyacrylamide such as CYANATROL 960-S sold by Amercian Cyanamid Co. may be used in the same concentration range. All these polymers are well known for use in oil field flooding activities.

EXAMPLES 1-4

To illustrate the operability of my invention and to show the very high efficiency of heavy oil displacement which can be achieved, experiments using the following procedure were performed. Unconsolidated Ottawa sand of 70-140 mesh size was packed into stainless steel columns. A separate column was packed for each experiment. The packing method insured that the sand packs had about the same porosity and permeability in each experiment. The sand pack was first saturated with brine at a high flow rate. The pack was placed in a temperature-controlled oven at a temperature of 90° C. The sand pack was flooded with heavy oil from the Lone Rock Reservoir in Canada to reduce the water saturation of the sand to near the irreducible amount. The viscosity of the Lone Rock oil under conditions of the floods at 90° C. was 60 cp. The sand pack was then flooded at a rate of 2 feet per day with a brine having the same salinity as the brine used to saturate the sand initially. The water flood was terminated after injecting 2 pore volumes of the brine, reducing the oil saturation to a water flood value, called $S_{ow}$. The sand packs were then flooded with 0.2 pore volumes of a 2% active surfactant solution in the same brine as used previously in the column. This flood was conducted at a rate of 1 foot per day. The pH of each surfactant solution had been adjusted to about 8 with sodium hydroxide. Finally, the sand pack was flooded with 2 pore volumes of polymer solution in a brine of lower salinity than that previously in the column. This flood was conducted at a rate of 2 feet per day, also. The final oil saturation after the chemical flood ($S_{of}$) was determined from the volumes of oil in place in the column and the volume of oil recovered. Recovery efficiency ($E_r$) was calculated using the oil recovered with the chemical flood as a percentage of the oil present after the water flood, $S_{ow}$. The brine used in Examples 1 and 2 contained 11,500 mg/L sodium, 1,100 mg/L calcium, a small amount of magnesium, and about 20,000 mg/L chloride for a total dissolved solids of 33,234 mg/L. Brine used in Examples 3 and 4 was obtained by dilution of the brine used in the first two floods to one-third of the total salinity. The sand packs were 30.5 cm in length, and 5.1 cm in diameter. A summary of the properties of the sand packed columns and the flood results are shown in Table 1.

Notice that the oil saturation after the waterflood of each sand pack column was near 40%. As shown in Table 1, the weight fraction of petrochemical sulfonate in each surfactant mixture was either 0.70 or, in Example 3, 0.95. The co-surfactant is shown by its name in Table 1. After 0.2 pore volume of the mixture of petrochemical sulfonate and co-surfactant mixture was injected, the polymer solution followed. The commercial names of the polymers used are shown in Table 1. The final oil saturations achieved after injecting approximately 2 pore volume of the polymer solution are shown in the table.

TABLE 1

| Example | 1 | 2 | 3 | 4 |
|---|---|---|---|---|
| Porosity, (%) | 41.3 | 42.6 | 43.0 | 39.0 |
| Permeability, mD | 1,024 | 1,078 | 1,003 | 1,050 |
| Initial Oil Saturation, $S_{oi}$ | 0.87 | 0.84 | 0.773 | 0.822 |
| Oil Saturation After Water Flood, $S_{ow}$ | 0.40 | 0.40 | 0.383 | 0.369 |
| Brine Concentration, ppm TDS | 33,234 | 33,234 | 11,078 | 11,078 |
| Weight % Surfactant Blend | 2.0 | 2.0 | 2.0 | 2.0 |
| Weight Fraction Sulfonate[1] in Blend | 0.7 | 0.7 | 0.95 | 0.7 |
| Co-Surfactant | N-60PS[2] | N-60PS[2] | SIPONATE[3] A-246LX | SIPONATE[3] A-167 |
| Polymer | FLOCON[4] | ACTIGUM[5] | FLOCON[4] | FLOCON[4] |
| Polymer Concentration, ppm | 2,000 | 1,600 | 2,000 | 2,000 |
| Final Oil Saturation After Chemical Flood, $S_{of}$ | 0.139 | 0.136 | 0.170 | 0.130 |
| Recovery Efficiency, $E_r$ (%) | 65 | 66 | 56 | 65 |

[1] Sodium Salt of ARISTOL B, Pilot Chemical Co. - Santa Fe Springs, CA
[2] Non-commercial product of Texaco Chemical Co. - Houston, Texas
[3] Alcolac Inc. - Baltimore, MD
[4] Pfizer, Inc. - NY
[5] Merot Rousselot Satia - Carentan, France Notice that very low oil saturations, in the range of 0.13 to 0.17 pore volume, were achieved. About 60 to 65% of the oil left after the water floods was recovered. These results were much more favorable than expected, and they indicate very high efficiency for the surfactant and polymer solutions described in my invention.

EXAMPLE 5

For the purpose of additional disclosure but without placing restrictions on my invention, a field example is provided below.

A heavy oil deposit exists at a depth of 3100 feet. The oil has a viscosity at reservoir temperature of 900 cp, but this viscosity is lowered to 50 cp at a temperature of 90 degrees C. The reservoir water has total dissolved solids of 30,000 ppm, with the ratio of sodium to divalent calcium ion of about 10. Wells have been drilled in the field at a density of one well per 1? acres. The oil production rate from the wells is negligible using normal non-thermal recovery techniques. Steam generators are bought into the field and steam is injected into some of the wells for three months, then these wells are produced for three months while steam is injected into other wells for an equal time. This cycle of steam injection and oil production is repeated two to six times in the wells, in the process sometimes called "huff and puff" production. At this time oil recovered from these wells is only about 3% of the oil in place in the 10 acres surrounding each well. Steam is then injected for nine months into selected wells which form "five spot" patterns of four injection wells surrounding one production well in the center of the patterns. At this time, steam production has sharply increased in the production wells, indicating a continuous steam bank from one or more injection wells to the center production well in each pattern. Oil recovery has increased to about 6% of the oil in place. A slug of produced reservoir brine containing 2% by weight of a mixture of petrochemical sulfonate and a propane sulfonate of nonyl alcohol plus 6 units of ethylene oxide is injected, the slug of water volume being about 20% of the volume of the steam zone in the reservoir. The petrochemical sulfonate is the sodium salt of ARISTOL B, manufactured by Pilot Chemical Company. The ratio of petrochemical sulfonate to co-surfactant is 0.7:0.3. The slug is followed by steam until the volume of steam injected is about equal to the volume of the steam zone. Another slug of brine and surfactant having the same composition is injected at this time, and followed by a slug of a solution of 1800 ppm of a polysaccharide biopolymer. The biopolymer is manufactured by Pfizer, Inc. and sold under the trade name FLOCON 4800 MT. The slug of biopolymer solution is followed by another volume of steam about equal to the volume of the steam zone. The steam is followed by a volume of the surfactant solution equal to that in the first slug, and then by a volume of biopolymer solution equal to 50% of the volume of the steam zone. At this time recovery of oil is expected to equal 25% of the oil in place in the area between the wells. It is calculated that the amount of oil recovered without use of the surfactant solution in the slugs of water would have been only 15% of the amount of oil in place.

While my invention has been described in terms of a plurality of illustrative embodiments, it is clearly not meant to be limited by these embodiments, since many variations thereof will be apparent to persons skilled in the related art without departing from the true spirit and scope of my invention.

I claim:

1. A method of recovering viscous petroleum from a subterranean, porous and permeable formation penetrated by at least one injection well and by at least one production well, both in fluid communication with the formation, comprising the steps of:
   (a) injecting through injection wells a mixture of steam and hot water, a part of the hot water comprising a mixture of a petrochemical sulfonate and an effective amount of compounds having the formula

where R is selected from the group consisting of alkyl having 8 to 12 carbon atoms and alkyl-aryl having a linear or branched alkyl of 6 to 18 carbon atoms, n is from 2 to 10, and M is a monovalent cation, at a total surfactant concentration between 0.5% and 5.0% by weight;
   (b) injecting through the same wells where the steam and hot water mixture was injected an aqueous slug of surfactant solution at a concentration of surfactant between 0.5% and 5.0% by weight, comprising a petrochemical sulfonate and an effective amount of the same compounds used in step (a);
   (c) injecting a slug of water-soluble polymer solution through the same wells where the surfactant solution was injected; and
   (d) recovering petroleum through production wells.

2. The method of claim 1 wherein steps (b) and (c) are repeated one or more times.

3. The method of claim 1 wherein steps (a), (b) and (c) are repeated.

4. The method of claim 1 wherein steps (a) and (b) occur simultaneously and are followed by step (c).

5. A method of recovering viscous petroleum from a subterranean, porous and permeable formation penetrated by at least one injection well and by at least one production well, both in fluid communication with the formation, comprising the steps of:
   (a) injecting through injection wells a mixture of steam and hot water, a part of the hot water comprising a mixture of a petrochemical sulfonate and an effective amount of an olefin sulfonate, at a total surfactant concentration between 0.5% and 5.0% by weight, having the formula

where x is 0 to 15, x + y is 9 to 15, and M is a monovalent cation;
   (b) injecting through the same wells where the steam and hot water mixture was injected an aqueous slug of surfactant solution at a concentration of surfactant between 0.5% and 5.0% by weight comprising a petrochemical sulfonate and an effective amount of an olefin sulfonate;
   (c) injecting a slug of water-soluble polymer solution through the same wells where the surfactant solution was injected; and
   (d) recovering petroleum through production wells.

6. The method of claim 5 wherein steps (b) and (c) are repeated one or more times.

7. The method of claim 5 wherein steps (a), (b) and (c) are repeated.

8. The method of claim 5 wherein steps (a) and (b) occur simultaneously and are followed by step (c).

9. A method of recovering viscous petroleum from a subterranean, porous and permeable formation penetrated by at least one injection well and by at least one production well, both in fluid communication with the formation, comprising the steps of:
   (a) injecting a thermal recovery fluid into the formation to heat the formation above its natural temperature;

(b) injecting a surfactant solution into the formation, said surfactant solution comprising a mixture of petrochemical sulfonate and a co-surfactant, said co-surfactant being an olefin sulfonate having the general formula $$CH_3-(CH_2)_x-CH=CH-(CH_2)_y-SO_3^- M^+,$$

wherein x is 0 to 15, x+y is 9 to 15, and M is a monovalent cation;

(c) injecting a water-soluble polymer solution into the formation through the same well the surfactant solution was injected into; and (d) recovering petroleum through a production well.

10. The method of claim 9, wherein x is 5 to 12.

* * * * *